United States Patent [19]
Kruka

[11] 3,884,252
[45] May 20, 1975

[54] FRICTION REDUCTION
[75] Inventor: Vitold R. Kruka, Houston, Tex.
[73] Assignee: Shell Oil Company, Houston, Tex.
[22] Filed: June 20, 1973
[21] Appl. No.: 371,781

[52] U.S. Cl. .................................. 137/13
[51] Int. Cl. ............................... F16d 1/16
[58] Field of Search .............. 137/13; 252/8.3, 8.55; 166/275

[56] References Cited
UNITED STATES PATENTS

| | | | |
|---|---|---|---|
| 3,055,862 | 9/1962 | Bentley | 260/45.95 R |
| 3,493,000 | 2/1970 | Canevari | 137/13 |
| 3,730,275 | 5/1973 | McClaflin | 137/13 X |
| 3,736,288 | 5/1973 | Stratta | 137/13 X |

Primary Examiner—Alan Cohan
Attorney, Agent, or Firm—Fredrik Marlowe

[57] ABSTRACT

A process for reducing oxidative degradation and cold flow of polymer crumb by immersing the crumb in a non-solvent such as water and/or dusting the crumb with a powder such as calcium carbonate and 2,6 di-t-butylparacresol, 4,4'-methylene-bis-(2,6 - di-t-butylphenol) or other antioxidants.

A process for reducing fluid flow friction loss in pipeline transmission of a hydrocarbon fluid by providing a continuous source of dissolved polymer therein by injecting polymer crumb or a slurry of polymer crumb and water into the hydrocarbon fluid, whereby the crumb gradually and continuously dissolves during transmission of the crumb through the pipeline.

8 Claims, No Drawings

– 3,884,252 –

FRICTION REDUCTION

BACKGROUND OF THE INVENTION

Various polymers may be injected in small quantities into a flowing hydrocarbon system such as a pipeline to serve as friction reducing agents. In order to be effective as a friction reducing agent, the polymer must be in a dissolved state. A usual method for introducing the polymer into the flowing system involves pre-dissolving the polymer in a selected solvent or in a quantity of the hydrocarbon liquid which is the same as that in the flowing system and subsequently injecting the pre-dissolved polymer and solvent into the flowing system. Special dissolution equipment such as shredders or grinders for reducing the polymer to small particles, mixers, heaters and storage tanks are required. The concentration at which the polymer can be handled with such equipment is often relatively low, e.g., the order of a percent, and the time required for dissolution is long, e.g., the order of days, thus calling for large dissolution equipment. Also, the shearing action inherent in shredders, grinders and mixers tends to degrade or lower the molecular weight of the polymer, and centrifugal pumps associated with dissolution equipment severely degrade dilute polymer solutions, which reduces the friction reduction properties of the polymer.

Further, before the polymer is either dissolved or particulated by grinding, pulverizing or shredding, the polymer is subject to oxidative attack, which further reduces effectiveness of the polymer as a friction reduction agent. This is especially true when light and oxygen are present together, but degradation is also known to occur in complete darkness.

Accordingly, it is apparent that the prior art suffers disadvantages not only in preparing the polymer for dissolution but also in preserving the polymer until such time as it is used in the pipeline. The present invention overcomes these difficulties and provides a successful solution to these problems of the art, as will be apparent from the following description thereof.

SUMMARY OF THE INVENTION

The primary purposes of this invention reside in preventing or avoiding oxidative degradation of polymers useful for friction reduction, increasing polymer dissolution rate in selected solvents or flowing liquid hydrocarbons, increasing ease of polymer handling, and providing a system for introducing polymer into flowing liquid hydrocarbons which does not require special dissolution equipment.

The above purposes have been achieved by providing a polymer in crumb form, dusting the polymer with an oxidation preventing powder, dusting with a cold flow or blocking preventing powder and/or immersing the polymer in a non-solvent, and subsequently injecting the polymer crumb alone or as a slurry with a non-solvent into a flowing liquid hydrocarbon system.

The processes of this invention broadly extend, first, to reducing polymer oxidative degradation by immersing the polymer in a non-solvent; second, to reducing polymer oxidative degradation by dusting the polymer with 2,6 di-t-butylparacresol, 4,4,'-methylene-bis-(2,6 - di-t-butylphenol) or other antioxidant powders; and third, dusting with a cold flow preventing powder such as calcium carbonate; and fourth, continuously providing a source of dissolved polymer in a pipeline containing a flowing hydrocarbon by injecting a polymer crumb into the hydrocarbon.

Within the framework of the above described processes, the present invention not only solves the above mentioned problems of the prior art, but also achieves further significant advantages as will be apparent from the description of preferred embodiments following.

DESCRIPTION OF PREFERRED EMBODIMENTS

Polymers are usually marketed in solid form such as blocks or bales. Processing of the polymer for its end use, such as friction reduction, usually involves dissolution of the polymer. Dissolution rate is known to be approximately proportional to the contact area between polymer and solvent. To speed the dissolution rate, the polymer blocks or bales are shredded, ground or pulverized to small particles before addition of the solvent. In accordance with the present invention, this technique of the prior art is eliminated and the solid polymer is manufactured in crumb form. The crumb has a highly contorted surface and a substantially larger surface area than an equivalently sized or equivalent weight shredded particle. Thus, crumbs are more quickly dissolved than shredded particles so that the present invention avoids the shear degradation present in shredders and other mechanical means for preparing polymer blocks or bales for dissolution.

Various processes are available for producing the polymer in crumb form. Among these are suspension polymerization, emulsion polymerization, and crumb made in the finishing process of solution polymerization polymers. The latter can be achieved by exposing the polymer cement, injected through nozzles, orifices or the like, to steam. The steam strips the solvent from the cement.

Once the polymer is produced in crumb form, it may be subject to oxidative degradation until the source of oxygen, such as air, is removed. This is especially true when light and oxygen are present simultaneously and in the case of oleophilic polymers. The present invention additionally provides a technique for eliminating or limiting oxidative degradation of oleophilic polymers by essentially preventing oxygen-polymer contact. This is achieved by immersing the polymer in a non-solvent, such as deaerated water and other deaerated liquids which are not solvents for the polymer. Among such non-solvents water is preferred inasmuch as its cost is low and a water-crumb slurry may be injected directly into the flowing hydrocarbon system, thereby providing an efficient means of getting the polymer into the system.

The polymer can be made even further resistant to oxidative degradation by dusting with a powder, for example, 2,6 di-t-butylparacresol, 4,4,'-methylene-bis-(2,6, - di-t-butylphenol), 2,2'-methylenebis-(4-methyl-6-tert-butylphenol), or polymerized trimethyldihydroquinoline. Among these, a combination of 2,6 di-t-butylparacresol and 2,2'-methylenebis-(4-methyl-6-tert-butylphenol) is preferred for polyisoprene polymers. Such powders, like water, aid in preventing oxygen-polymer contact. The calcium carbonate powder makes the polymer easier to handle inasmuch as it prevents the polymer from being tacky and sticking together and to contacting equipment.

It is preferred to utilize the invention in the form of a slurry since liquid handling systems are easily subject to automation. Small crumb particles immersed in water at concentrations of from about 10 to about 65% create a slurry which has most of the properties of a liquid. The property of most interest is that it can be pumped through pipes, ducts, channels and other systems in a manner similar to that of a conventional liquid.

The present invention also provides a technique whereby dissolved polymer can be provided as needed in situ in the flowing hydrocarbon. Polymer is used up in the pipeline inasmuch as it is constantly degraded. Where all of the polymer is dissolved and injected into the pipeline, much of the polymer may be used up by pumps and the like before it is actually needed for friction reduction. On the other hand, where it is provided as a crumb which slowly dissolves along the entire length of the pipeline, less polymer is degraded than would be the case otherwise. Normally, a ⅜ inch crumb will dissolve in a pipeline in 2 to 4 days. The smaller the diameter of the crumb, the less time of dissolution is required. The present invention is especially useful where a short term application of friction reduction agent is required, for example when it is desired to increase the capacity of a pipeline for a limited time period or where a permanent dissolution station is being built and friction reduction is desired in the interim before the station is completed.

The present invention is useful with numerous different types of hydrocarbon systems and with different types of hydrocarbons. It may be employed to reduce friction with flowing crude oil or fractions thereof. The sole precaution is that the particular polymer being added should not interfere with the eventual use for which the hydrocarbon is intended. On the other hand, if desired, the polymer may subsequently be removed from the hydrocarbon system although this is generally a costly and complicated process. Usually, however, the polymer is present in the hydrocarbon in such small amounts that it does not interfere with any further use of the hydrocarbon.

It is preferred to introduce the polymer crumb as a slurry directly into the flowing hydrocarbon inasmuch as this realizes some of the main advantages of the present invention; that is, it allows in-situ dissolution of the polymer while the hydrocarbon is being transported. However, the polymer crumb can, of course, be introduced into a storage tank or other vessel containing the hydrocarbon before the hydrocarbon is introduced into the flowing system. Although this does not realize some of the principle advantages of the invention, it nonetheless shortens the time which normally would be taken for dissolution of the polymer inasmuch as the polymer crumb of the present invention dissolve relatively quickly. Whether the hydrocarbon to which the crumbs are added is flowing at a fast or slow rate makes little difference to the mode of introduction of the particles. However, relatively turbulent flow will speed dissolution of the polymer although hastening polymer degradation, while on the other hand, non-turbulent flow will slow both the rate of polymer dissolution and the rate of polymer degradation.

The hydrocarbon systems of this invention not only include either long or short pipelines but also extend to any situations where a hydrocarbon flows along a solid boundary in the turbulent region. Thus, the invention also covers the situation where the hydrocarbon is stationary and a solid surface is moving within the hydrocarbon. Hence, the present invention can be employed in a variety of environments to reduce the friction of the liquid hydrocarbon.

The present invention is suitable for use with most polymers useful for friction reduction. For example, polyisoprene, polyisobutylene, polydimethylsiloxane, polybutadiene, and various copolymers are highly suitable for use in the present invention. With such particles, friction reductions up to about 80 percent can be obtained in turbulent liquid flows. Generally, the most pronounced effectiveness occurs with linear polymers having higher molecular weights of the order of several million. Friction reduction for a given polymer is usually optimized by increasing polymer molecular weight while reducing polymer concentration.

The size of the polymer crumb is generally dictated by the rate at which dissolution is desired, with the particular polymer, and the length of the pipeline. In short pipelines, for example up to fifty miles, quick dissolution may be required and shear degradation may vary from non-detectable to only slight and therefore be of no concern. Accordingly, small particles of from about 1 micron to about 5,000 microns, preferably about 10 microns to about 500 microns are used. In long pipelines, for example five hundred miles or greater, moderate to substantial degradation of the polymer is known, especially in pumps, to occur resulting in a loss of friction reduction efficiency. In such lines, a distribution of particle sizes of from about 1 micron to about 20,000 microns, preferably from about 10 microns to about 10,000 microns, is injected in order that some crumbs will dissolve rapidly and give immediate friction reduction while others will dissolve more slowly and thus become effective further along the pipeline after the initially dissolved polymer has degraded.

The rate at which the polymer crumb dissolves is a function of the monomer, molecular weight, concentration, hydrocarbon liquid, temperature, shear rate existing in the flow, and size of polymer crumbs. Under ordinary circumstances the hydrocarbon liquid, temperature, and shear rate are fixed by the system in which it is desired to reduce frictional losses. The monomer, molecular weight, and concentration will usually be chosen such that a specified percent friction reduction can be achieved. Thus, the rate of polymer dissolution remains free to be controlled by the crumb size. For a given mass of polymer crumb at low concentrations, the dissolution rate is approximately proportional to the surface area exposed to the solvent, that is, small crumb dissolves quicker than large ones. Accordingly, the polymer is injected in crumb sizes tailored to suit specific needs as to rate of dissolution.

The polymer crumbs of the present invention may be used in various forms. A convenient form is dry crumbs since this requires no further preparation prior to introduction into the hydrocarbon system. A concentrated slurry can also be employed, inasmuch as this form is easy to handle and can be injected using a variety of equipment under a wide range of conditions without adverse effect to the hydrocarbon system or polymer. The slurry may be prepared using a non-solvent for the liquid phase, such as water.

The polymer crumb is preferably utilized in very low concentrations in the hydrocarbon system, as above noted. The concentration is dictated not only by the amount of degradation which occurs in the pipeline, which is in turn dependent upon the length of the pipeline and other factors, but also upon the reduction in friction which is to be required. Among the other factors which are most significant is the shear rate existing in the flow, which can substantially increase degradation. The use of high pumping pressures in small lines results in high shear rates as does flow through pumps; large lines with low pumping pressures result in smaller shear rates and therefore, less degradation. Accordingly, taking the above into consideration, it is broadly suitable to use from about 1 ppm to about 2,000 ppm of polymer in the hydrocarbon system, and it is preferable to use from about 5 to about 500 ppm. Manifestly, the concentration is also dependent upon the polymer in use since some polymers provide greater friction reduction than other polymers.

Generally, the polymer may be introduced at almost any place into the pipeline where it is convenient to add a solid or liquid material such as a slurry. Preferably, the polymer is introduced at pump suction inasmuch as the pump does not adversely affect the polymer crumbs which, unlike dissolved polymer as above mentioned, are not degraded by the pump. In addition, the pump functions to uniformly mix the polymer into the hydrocarbon system by creating turbulence which, in turn increases the rate of dissolution of the polymer into the hydrocarbon. Although it is preferred to add the hydrocarbon directly into the flowing system, it is, of course, possible to introduce the polymer crumbs into a pre-mixer and sacrifice any advantage of in-situ dissolution. The liquid in the pre-mixer can of course be the same as the liquid in the hydrocarbon system although under circumstances it can be different and indeed, under certain circumstances, it may favorably be different if it is a better solvent for the polymer.

In order to further illustrate the above invention, and without restriction or limitation thereon, the following example is presented:

EXAMPLE

A 35%v water slurry of a $14 \times 10^6$ molecular weight polyisoprene crumb is prepared. The crumb contains 1% weight 2,6 di-t-butylparacresol and is dusted with 1% weight 2,2'-methylenebis-(4-methyl-6-tert-butylphenol) and 10% weight calcium carbonate. The average crumb size is 9,500 microns (⅜-inch) with sizes ranging from 1,000 microns to 12,500 microns. The slurry is injected into a 24-inch 445 mile long pipeline at its point of initiation with a positive displacement pump such as a grease pump or a gear pump. The injection rate is 1.45 gpm. The pipeline carries a West Texas crude oil at 400,000 BPD and has 8 pump stations. The polymer dissolution rate in this crude oil is such that, at low concentrations, a 9,500 micron crumb dissolves in 2½ to 3 days. Pipeline transit time is 3 days, 2 hours. Total pipeline polymer concentration is 40 ppm. Average dissolved and effective (not degraded by pumps) polymer concentration per segment between pump stations will be 5 ppm yielding approximately 20% friction reduction.

I claim as my invention:

1. A process for continuously providing a source of dissolved polymer in a pipeline containing a flowing hydrocarbon comprising preparing polymer crumb by stripping solvent from a polymer cement and injecting said polymer crumb into the flowing hydrocarbon.

2. The method of claim 1 wherein the polymer crumb is slurried with a non-solvent.

3. The method of claim 2 wherein the non-solvent is water.

4. The method of claim 3 wherein the crumb has been dusted with 2,6 di-t-butylparacresol and 2,2'-methylenebis-(4-methyl-6-tert-butylphenol) powder to reduce oxidative degradation thereof.

5. The method of claim 4 wherein the polymer is polyisoprene.

6. The method of claim 5 wherein the crumb is about three-eighths inches diameter and requires from about two to about four days to completely dissolve in a flowing crude oil pipeline.

7. A process for reducing the fluid flow friction loss of a hydrocarbon in a conduit comprising preparing polymer crumb by steam stripping polymer cement to remove solvent, protecting the crumb from oxidative degradation by immersing the crumb in water to form a slurry, injecting the slurry into the conduit containing the flowing hydrocarbon, allowing the crumb to slowly dissolve during passage through the conduit to continuously supply dissolved polymer to the flowing hydrocarbon.

8. A process for reducing the fluid flow friction loss of a hydrocarbon in a conduit comprising preparing polymer crumb by stripping polymer cement to remove solvent, protecting the crumb from oxidative degradation by mixing the crumb with antioxidant selected from the group consisting of 2,6 di-t-butylparacresol, 2,2'-methylenebis-(4-methyl-6-tert-butylphenol) and 4,4,'-methylene-bis-(2,6, - di-t-butylphenol), injecting the crumb into the conduit containing the flowing hydrocarbon, allowing the crumb to slowly dissolve during passage through the conduit to continuously supply dissolved polyisoprene to the flowing hydrocarbon allowing the crumb to slowly dissolve during passage through the conduit to continuously supply dissolved polymer to the flowing hydrocarbon.

* * * * *